US011740638B2

(12) United States Patent
Mosebach et al.

(10) Patent No.: US 11,740,638 B2
(45) Date of Patent: Aug. 29, 2023

(54) METHOD FOR GENERATING AN AREA MAP FOR AN AUTOMATICALLY MOVING FLOOR PROCESSING DEVICE, AND SYSTEM COMPRISED OF TWO AUTOMATICALLY MOVING FLOOR PROCESSING DEVICES

(71) Applicant: Vorwerk & Co. Interholding GmbH, Wuppertal (DE)

(72) Inventors: Andrej Mosebach, Unna (DE); Marc Papenheim, Wuppertal (DE); Henning Hayn, Hilden (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 181 days.

(21) Appl. No.: 17/078,175

(22) Filed: Oct. 23, 2020

(65) Prior Publication Data

US 2021/0121036 A1    Apr. 29, 2021

(30) Foreign Application Priority Data

Oct. 25, 2019  (DE) ..................... 10 2019 128 927.0

(51) Int. Cl.
*G05D 1/02*    (2020.01)
*A47L 11/40*    (2006.01)
(Continued)

(52) U.S. Cl.
CPC ........ *G05D 1/0274* (2013.01); *A47L 11/4011* (2013.01); *G05D 1/0219* (2013.01);
(Continued)

(58) Field of Classification Search
CPC ......... G05D 2201/0203; G05D 1/0219; G05D 2201/0215; A47L 2201/06; A47L 11/4011
See application file for complete search history.

(56) References Cited

U.S. PATENT DOCUMENTS 10,478,037 B2 * 11/2019 Duenne ................ G05D 1/0274
10,575,699 B2 *  3/2020 Bassa ................... G05D 1/0246
(Continued)

FOREIGN PATENT DOCUMENTS

DE    10 2017 113 612 A1   12/2018
EP       2 330 471 B1      10/2015

*Primary Examiner* — Nicholas Kiswanto
*Assistant Examiner* — Christopher A Buksa
(74) *Attorney, Agent, or Firm* — Collard & Roe, P.C.

(57) ABSTRACT

A method for generating an area map for a floor processing device, wherein first and second floor processing devices detect feature data of an environment and process them into first and second area maps. The first floor processing device identifies an object based on a unique identifier of the object as an anchor point and stores relative positional information of the anchor point in a coordinate system of the first area map. The second floor processing device recognizes the same object as an anchor point known to the second floor processing device, and stores relative positional information of the anchor point in a coordinate system of the second area map. The first and second area maps are combined into a common global area map based on the relative positional information of the anchor point contained therein, and the unique identifier is a code that clearly identifies the object.

9 Claims, 2 Drawing Sheets

(51) Int. Cl.
G06V 20/10 (2022.01)
G06V 10/24 (2022.01)

(52) U.S. Cl.
CPC ............ G05D 1/0236 (2013.01); G06V 20/10 (2022.01); *A47L 2201/06* (2013.01); *G05D 2201/0203* (2013.01); *G06V 10/245* (2022.01)

(56) References Cited

U.S. PATENT DOCUMENTS

2019/0210849 A1\* 7/2019 High ................ H04W 4/80
2019/0212752 A1\* 7/2019 Fong ................ G05D 1/0274

\* cited by examiner

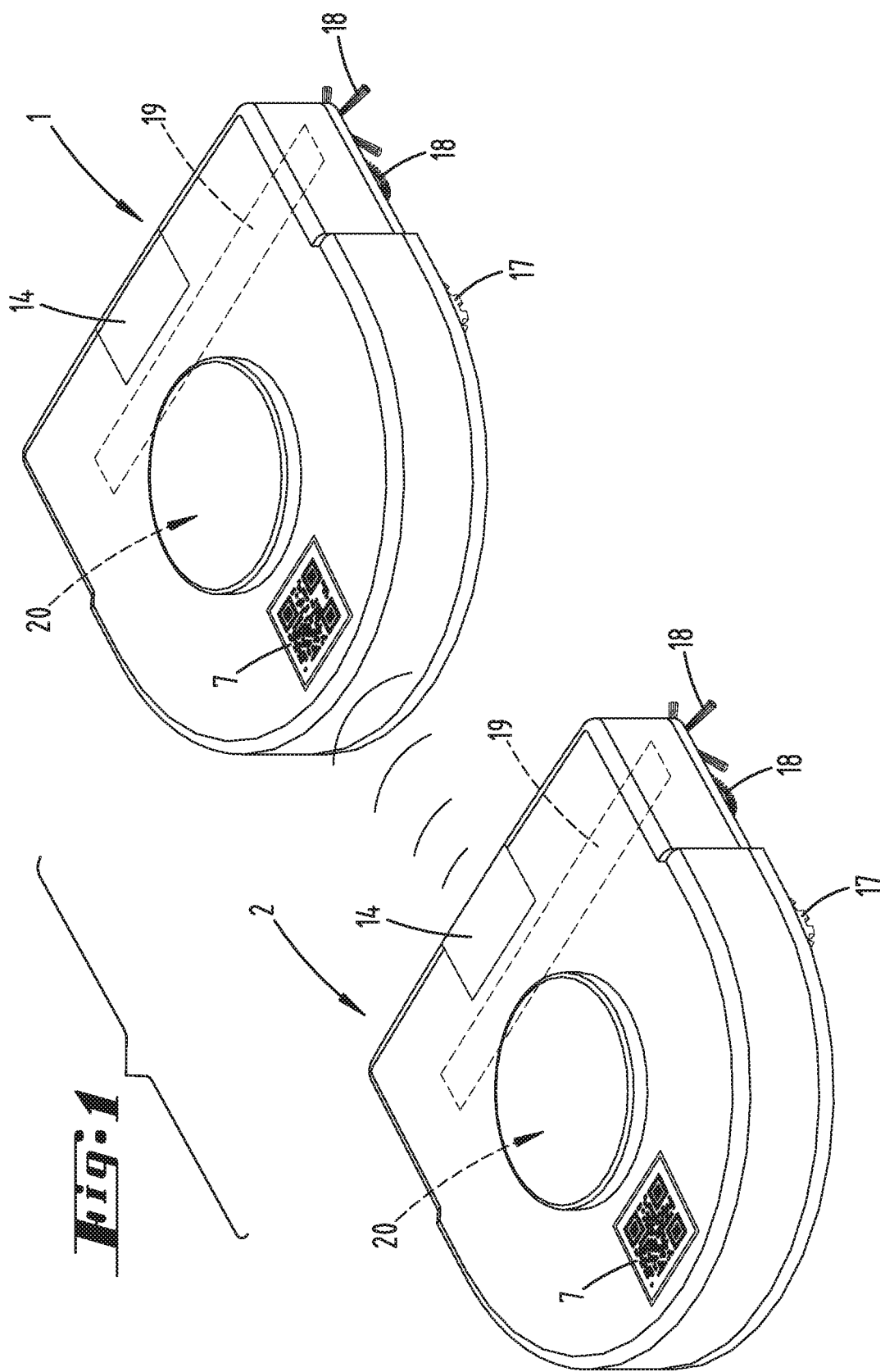

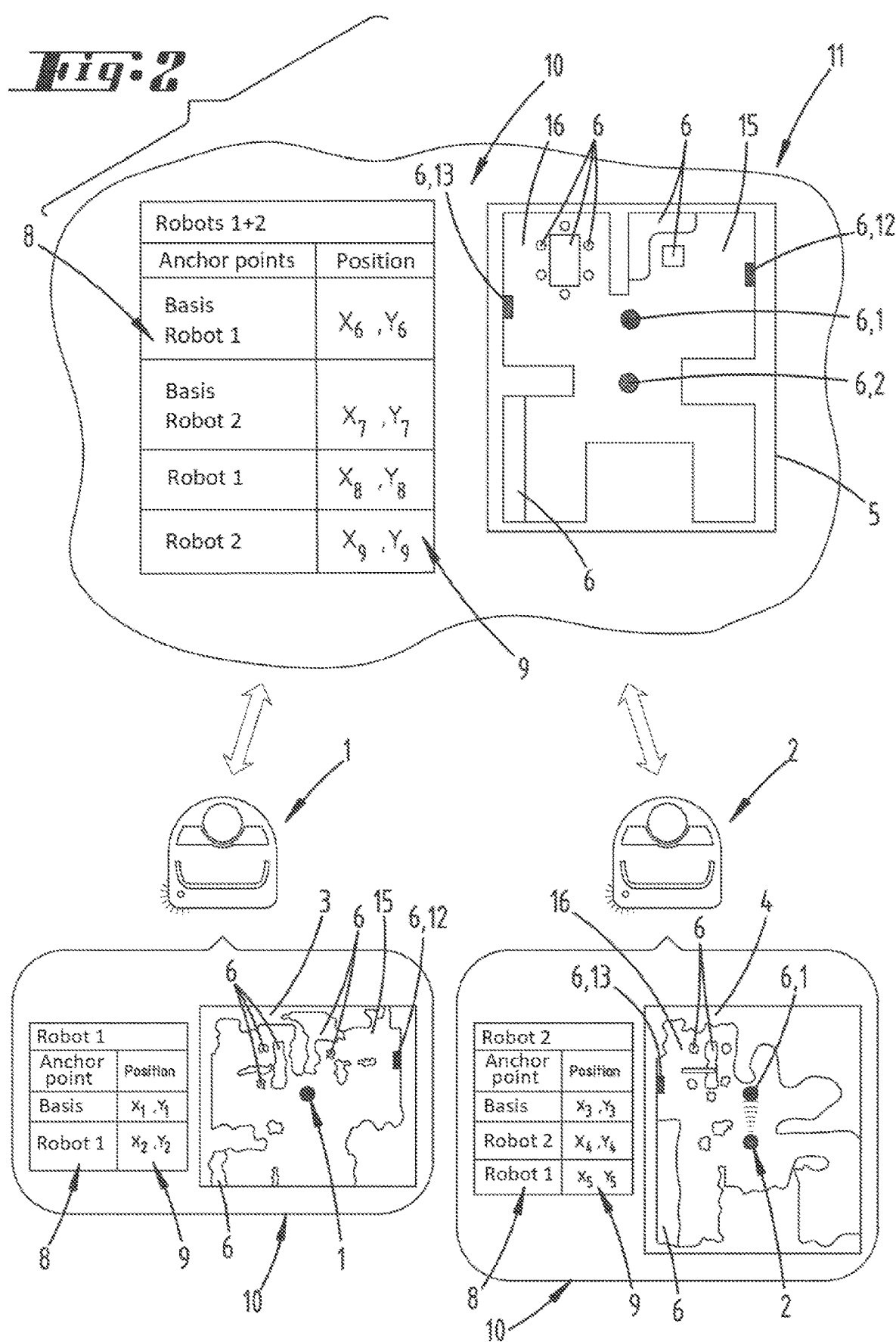

METHOD FOR GENERATING AN AREA MAP FOR AN AUTOMATICALLY MOVING FLOOR PROCESSING DEVICE, AND SYSTEM COMPRISED OF TWO AUTOMATICALLY MOVING FLOOR PROCESSING DEVICES

CROSS-REFERENCE TO RELATED APPLICATIONS

This application claims priority under 35 USC 119 of German Application No. 10 2019 128 927.0 filed on Oct. 25, 2019, the disclosure of which is herein incorporated by reference.

BACKGROUND OF THE INVENTION

1. Field of the Invention

The invention relates to a method for generating an area map for an automatically moving floor processing device, wherein a first floor processing device detects first feature data of an environment and processes them into a first area map, wherein a second floor processing device detects second feature data of the environment and processes them into a second area map, wherein the first area map and the second area map are combined into a common area map.

In addition, the invention relates to a system comprised of at least a first automatically moving floor processing device and a second automatically moving floor processing device.

2. The Prior Art

Automatically moving floor processing devices are sufficiently known in prior art. For example, Patent Specification EP 2 330 471 B1 discloses an automatically movable sweeping and/or vacuuming robot, which generates and stores an area map. The area map is generated by means of a measuring device of the robot via environmental data acquisition and subsequent data processing. The area map stores room boundaries and obstacles, so that a favorable traversing strategy can be developed for the robot based on the area map, for example for cleaning a floor surface.

Additionally known from DE 10 2017 113 612 A1 is a method for generating a three-dimensional area map for a cleaning system, wherein at least two partial areas of the environment are acquired by means of a sensor system, wherein two datasets representing the respective partial areas, for example area maps, are transferred to a central storage device, and wherein a three-dimensional area map is generated by combining the partial areas. For this purpose, a common overlapping area of the two partial areas is analyzed in relation to characteristic features of the environment, which are then used to combine the datasets of the partial areas.

Even though a method of the aforementioned kind delivers satisfactory results if a sufficient number of characteristic features is found in the datasets of the partial areas of the environment, it becomes more difficult to combine the partial areas into a common area map if only a very few characteristic features are available instead.

SUMMARY OF THE INVENTION

Therefore, the object of the invention is to create a method for generating a combined area map for an automatically moving floor processing device that delivers optimal results even given a small overlapping area of partial maps.

In order to achieve the aforementioned object, the invention proposes that the first floor processing device identify an object based on a unique identifier of the object as an anchor point of the environment known to the first floor processing device, and store relative positional information of the anchor point in a coordinate system of the first area map, wherein the second floor processing device recognizes the same object as an anchor point known to the second floor processing device, and stores relative positional information of the anchor point in a coordinate system of the second area map, and wherein the first area map and the second area map are combined into a common global area map based on the relative positional information of the anchor point contained therein, and wherein the unique identifier is a code that clearly identifies the object, specifically an optical code, an electronic code, a magnetic code, a shape coding and/or a color coding.

According to the invention, two or even more automatically moving floor processing devices each generate a separate area map, which is designed as a local area map, and has a coordinate system relating to the respective floor processing device. The area maps are then analyzed for known anchor points, which are represented by objects having a unique identifier. A unique identifier within the meaning of the invention clearly identifies the object, so that an evaluation unit of the floor processing device can identify the object as a known anchor point in the environment. The respective area map of a floor processing device is then enhanced by the positional information of the object, and if necessary additional information about the discovered anchor point, for example a name or an ID. The positional information is preferably stored as a coordinate designation of the anchor point in the coordinate system of the area map. The area map is enhanced in this way for several, at least two, floor processing devices of the system, wherein anchor points recognized by the respective floor processing device are marked in each area map. The objects detected by the floor processing devices here at least partially coincide, wherein at least one anchor point must be identically present in both area maps. The clearly identified anchor points include not only objects outside of the floor processing devices. Rather, the floor processing devices themselves are also anchor points, even relative to the separate area map of the floor processing device.

According to the invention, the area maps of the floor processing devices are combined based on identical anchor points, wherein it is verified, in particular based on a correlation analysis, whether the area maps match each other, and can thus be combined into a common, global area map. The area maps are combined by identifying an anchor point which is equally present both in the first area map of the first floor processing device, as well as in the second area map of the second floor processing device. Since the area maps of the floor processing devices are each relative area maps that use separate coordinate systems and relate to a device-specific origin, the area maps must first be aligned with each other in relation to their coordinate systems. The anchor points identically present in both area maps are here put on top of each other, and defined as a new anchor point for the common, global area map. The feature data of the environment additionally contained in the respective area maps are stored relative to the new anchor point of the global area map, so that the resultant common, global area map consists of an intersection of the two area maps and partial area map regions, which were only contained in the first or second area map. As opposed to the prior art, it is not required that the individual area maps of the floor processing devices have an especially large overlapping region with as many characteristic features as possible. Rather, it is sufficient that the area maps have only a common, identical anchor point, and that the spatial orientation of the respective floor processing device relative to the anchor point, in particular a partial region of the anchor point having the identifier, be known.

As a result of the invention, then, a common, global area map for several robots is generated especially fast, and without requiring a large matching number of features in the environment. The area maps of several floor processing devices are combined based on the recognition of uniquely defined objects, which can be fixed points in the environment, but also floor processing devices or base stations for the latter.

In order to implement the method, a user has several floor processing devices, which can be different from or identical to each other. For example, the floor processing devices can be vacuuming robots, mopping robots, mowing robots, waxing robots, polishing robots, or mixed forms thereof. The automatically moving floor processing devices are capable of generating a separate area map of the environment. Furthermore, each floor processing device preferably knows how many and what additional floor processing devices belong to the used system, in particular how many and which floor processing devices are participating in a common floor processing task. For example, the user has a mobile terminal, in particular a mobile telephone, a tablet computer or the like, which stores an application in which he or she registers the used floor processing devices. If the user wants to initiate floor processing, he or she specifies in the application which of the registered floor processing devices are to be used for floor processing. Therefore, which floor processing devices are participating in a floor processing task is known from the data compiled in the application, in particular to the floor processing devices themselves. The application here preferably also includes information about how many floor processing devices are participating in a floor processing task, and what types of devices are involved. Accordingly, device types can be specified in the application. Operating the floor processing devices does not require that an area map of the surface to be processed already be present at this time. The floor processing devices also initially do not have to have any knowledge about where which floor processing device is currently located in the environment. This information can be only be gathered during operation. The global area map of the environment generated according to the invention can basically be generated based on area maps that either were recorded during a floor processing operation, or generated during a pure exploratory run, for example.

It is proposed that the floor processing device transmit its area map to a database that belongs to an external server and/or some other floor processing device and is jointly allocated to the floor processing devices, wherein a computing unit allocated to the database analyzes the area maps with respect to anchor points contained therein, recognizes an identical anchor point stored in several area maps, and superposes the area maps according to the relative positional information of the identical anchor point. As a consequence, the global area map can be generated either on an external server, for example in a so-called "cloud", or in a floor processing unit. To this end, the area maps of the respective floor processing devices are then transmitted to the appropriate floor processing device or the external server, stored in the database there, and analyzed with respect to known anchor points contained therein. If the computing unit determines during the analysis that the area maps of two or even several floor processing devices contain identical anchor points, the respective area maps are superposed according to the relative positional information of this anchor point stored in the area maps, so as to create the global area map. The coordinate systems of both floor processing devices are combined here, so that their local area maps are combined into a common, global area map. In order for the described method to function, the identified anchor points are known, specifically identifiable by their unique individual identifier. In particular, the database can have a table that contains known anchor points.

It is proposed that the database have information about one or several anchor points present in the environment, and that the information stored in the database be drawn upon for a comparison with objects present in an area map. The area map is analyzed based on the information stored in the database, specifically the unique identifiers of objects, wherein objects present in the area map are checked to see whether they involve defined anchor points known to the system.

It is proposed that the unique identifier be a code that clearly identifies the object. In particular, the code can be an optical code, an electronic code, a magnetic code, a shape coding and/or a color coding. Based on the type of unique identifier, the latter can be detected by means of a suitable detection unit of the floor processing device. In particular, the detection unit can be a camera, a laser scanner or an electronic and/or magnetic transmitter/receiver. The unique identifier can especially be a QR code or an otherwise uniquely designed marker, which is arranged, applied, or displayed on the object. As an alternative, for example, use can also be made of electronic tags that have stored the unique identifier. These tags preferably function based on RFID, NFC, Bluetooth beacons or the like. Based on the type of present identifier, the floor processing device has a detection unit suitable for reading out. The detection unit reads out the unique identifier of the object, and transmits the information contained therein to a computing unit, which thereupon makes a corresponding notation in the generated area map. Based on the information contained, the identifiers of the known anchor points stored in the database can finally be compared with the identifiers of the detected objects, so as to determine whether a detected object does in fact involve a known anchor point of the environment.

For example, the object having the identifier can itself be a floor processing device, or a base station that provides a service activity for a floor processing device, or a fixed element of a living space in the environment, for example a partial area of a window, a door, a furniture item or a mural. For example, a base station for a floor processing device is understood to include those stations that are able to charge an accumulator of the floor processing device, receive suction material from the floor processing device, clean the floor processing device, hold accessories for the floor processing device, or the like. For example, these also include freshwater stations, suction stations, or the like. In this sense, the objects can include those that belong to the floor processing system anyway, specifically comprising either floor processing devices or base stations for the latter. Alternatively possible as well, however, are fixed points in the environment, which usually are not moved by a user, in particular windows, doors, heavy furniture items, murals or the like.

An embodiment can provide that the first floor processing device detect the second floor processing device, and transmit a query signal to the second floor processing device, wherein the second floor processing device responds to the query signal by exploring its environment and detecting the first floor processing device, wherein the floor processing devices mutually identify each other based on their identifiers. According to this embodiment, a floor processing device of the system is itself an anchor point, i.e., an object that can be identified by a unique identifier. In one embodiment, communication between several floor processing devices supports the clear recognition of the floor processing device. For example, if a first floor processing device recognizes a second floor processing device as a floor processing device based on its exterior shape, it can send an query signal to the environment (without specific receivers) or specifically to this floor processing device, so as to initiate an environmental detection by this floor processing device. The floor processing device from among several floor processing devices of the system that reacts to the query in its immediate surroundings is thereby identified. As a result, both floor processing devices know which floor processing device is currently in the environment.

For example, an anchor point can alternatively be identified by having a floor processing device detect a base station of another floor processing device, and then compare the area maps of several floor processing devices located in the accompanying area to determine which base station is involved. For example, a first floor processing device can begin by generating a local area map, and store a base station allocated to it in the generated area map. If a second floor processing device detects a base station during a floor processing operation or even a pure exploratory run, the currently detected environmental information of this second floor processing device can be compared with the area map of the first floor processing device, so as to arrive at an orientation of the area maps relative to each other based on the respectively contained base station.

In addition, it can be provided that the generated global area map store authorization information for at least one partial environmental area, which indicates which floor processing device can or cannot pass through the partial environmental area. Therefore, the area map stores information about which partial environmental areas denoted in the global area map can be traversed by a specific floor processing device, and which ones cannot. Based on this authorization information stored in the area map, a working strategy can be defined that precludes a specific partial environmental area from being processed repeatedly by different floor processing devices. The environment is thus divided up in such a way that the floor processing devices do not process the same areas whenever possible. Such authorization information can likewise be used to assign partial environmental areas to individual floor processing devices that are to be mapped once again by the latter. The background to this is that the floor processing devices are preferably not to map identical partial environmental areas, so as to economize on time while generating or updating the global area map. In this sense, it can be provided that the generated global area map store authorization information for at least one partial environmental area indicating which floor processing device can or cannot map the partial environmental area. Before a floor processing device starts moving through the environment, in particular for purposes of floor processing and/or generating/updating an area map, it can use the global area map to first inquire about which authorizations are assigned to it for this purpose, i.e., which partial environmental areas of the environment it can traverse and/or map.

Finally, the method provides that the floor processing device or the several floor processing devices navigate according to the common global area map once it has been generated. The local area map of the respective floor processing device is hence replaced by the common global area map.

In addition, the invention proposes a system comprised of at least one first automatically moving floor processing device and a second automatically moving floor processing device, wherein the floor processing devices are designed to implement a method according to the invention described above. The outlined features and advantages of the method thus also arise accordingly for the system according to the invention. Apart from two or more floor processing devices, the system can additionally comprise one or several objects having a unique identifier, where these objects differ from the floor processing devices. As a consequence, the objects of the system having a unique identifier can on the one hand involve a floor processing device, or alternatively or additionally on the other hand involve a base station for a floor processing device, another object in the environment, for example furniture items, televisions, vases, flowers, paintings, doors, windows, or the like.

BRIEF DESCRIPTION OF THE DRAWINGS

The invention will be explained in more detail below based on exemplary embodiments. In the drawings:

FIG. 1 is a system with two floor processing devices, and

FIG. 2 is a sketched process sequence for generating a global area map out of two local area maps of the floor processing devices.

DESCRIPTION OF THE EMBODIMENTS

FIG. 1 shows a system comprised of two floor processing devices 1, 2, for example which are here designed as mobile cleaning devices. Each of the floor processing devices 1, 2 has a navigation unit 20, for example which has a distance measuring unit, in particular a laser distance sensor. The navigation unit 20 detects distances to objects 6 (see FIG. 2) within the environment of the respective floor processing device 1, 2, and generates an area map 3, 4 therefrom. The objects 6 can on the one hand be walls, windows, doorframes, door leaves, fixtures, furniture and the like, and on the other hand objects 6 belonging to the system of the floor processing devices 1, 2, here specifically the floor processing devices 1, 2 themselves along with base stations 12, 13 for the latter. For example, the distance sensor can have a laser diode, whose emitted light beam is guided out of a housing of the floor processing device 1, 2 via a deflection unit, and can be rotated around a rotational axis that is perpendicular in the conventional use position of the floor processing device 1, 2, in particular with a measuring angle of 360°. This permits an all-round distance measurement. The distance sensor can thus be used to measure the environment of the floor processing device 1, 2 in a preferably horizontal plane, i.e., in a plane essentially parallel to the surface to be cleaned. As a result, the floor processing device 1, 2 can be moved in the environment without colliding with objects 6. The generated area map 3, 4 is also used to self-localize the floor processing device 1, 2 within the separate area map 3, 4, as well as to navigate within the environment proceeding therefrom.

Each area map 3, 4 contains the detected objects 6 in a local coordinate system of the floor processing device 1, 2. The origin of the local coordinate system can preferably coincide with a point of the floor processing device 1, 2. The floor processing device 1, 2 additionally has electric motor-driven wheels 17, with the help of which the floor processing device 1, 2 can move over a surface to be cleaned. In addition, cleaning elements 18, for example here rotating brushes, are located underneath the floor processing device 1, 2. The cleaning elements 18 are advantageously allocated to a suction mouth 19, through which the floor processing device 1, 2 can suck in air loaded with suction material. For this purpose, the floor processing device 1, 2 additionally has a motor-blower arrangement (not shown in any more detail). In order to supply electricity to electrical consumers of the floor processing device 1, 2, for example to drive the wheels 17 and cleaning elements 18, the floor processing device 1, 2 has a rechargeable accumulator (not shown).

The floor processing devices 1, 2 additionally have an individual, unique identifier 7, which clearly identifies the respective floor processing device 1, 2. This identifier 7 is here only exemplarily an optical code, for example a QR code. Of course, other types of identifiers 7 are alternatively also possible, to also include in particular other optical identifiers 7, but also electronic, magnetic, or other identifiers. It is essential that the identifier 7 clearly identify the respective floor processing device 1, 2. The identifiers 7 of the floor processing devices 1, 2 are here arranged on an upper housing side in such a way that an optical detection unit 14, specifically a laser scanner, of the respective other floor processing device 1, 2 can read out the identifier 7 and identify the floor processing device 1, 2. To this end, the floor processing devices 1, 2 have a memory 10 with a file, in which the identifiers 7 of several floor processing devices 1, 2 of the system are stored. The memory 10 can either be a local memory 10 of the respective floor processing device 1, 2, or also a central memory 10 of a server 11 of the system. The memory 10 additionally has information about designations 8 and positional information 9 about other clearly identified objects 6 in the environment, in particular allocated to the local area map 3, 4 of the respective floor processing device 1, 2. Objects 6 that have been detected and identified by the floor processing device 1, 2 serve as anchor points during the map generation and navigation of the floor processing device 1, 2. This will be explained with reference to FIG. 2.

FIG. 2 schematically illustrates an interaction between the two floor processing devices 1, 2 of the system for generating a global area map 5, which both floor processing devices 1, 2 can use for subsequent cleaning operations. Apart from the exemplarily shown floor processing devices 1, 2, the system can also have other floor processing devices (not depicted). This will not affect the invention or functionality of the method. Aside from the two floor processing devices 1, 2, the system for cleaning an environment shown here comprises two base stations 12, 13, wherein a first base station 12 is allocated to the first floor processing device 1, and wherein a second base station 13 is allocated to the second floor processing device 2. The base stations 12, 13 can perform service activities on the respective floor processing device 1, 2, for example charge the accumulator of the floor processing device 1, 2, or also alternatively or additionally remove suction material from a suction material chamber of the floor processing device 1, 2, provide accessories for the floor processing device 1, 2 or the like. The system further comprises an external server 11, here a so-called "cloud", with a central memory 10.

In addition, the system can have allocated to it a mobile end terminal (not shown), for example a mobile telephone, a tablet computer, a laptop, or the like, on which an application is installed that gives the user of the system the ability to configure the system and control the floor processing devices 1, 2. The application allows the user to register the floor processing devices 1, 2 along with the base stations 12, 13, so that a computing unit of each of the floor processing devices 1, 2 has information about which other floor processing devices 1, 2 and base stations 12, 13 are present in the system. If the user would then like to have one or several of the floor processing devices 1, 2 perform a cleaning process via the application, he or she can input a corresponding cleaning request into the mobile end terminal, whereupon a corresponding floor processing operation is then controlled. For example, if the user now expresses a cleaning request for both floor processing devices 1, 2, each of the floor processing devices 1, 2 either starts a cleaning operation directly, or alternatively also first starts an exploratory run to generate a local area map 3, 4. For example, each of the floor processing devices 1, 2 here begins directly with cleaning the environment, wherein a local, persistent area map 3, 4 is simultaneously generated. During the cleaning process, objects 6 to be clearly identified, for example the respective base station 12, 13 of the floor processing device 1, 2, are identified and noted in the area map 3, 4 of the floor processing device 1, 2. The clearly identified objects 6 comprise anchor points within the area map 3, 4. The individual position of the respective floor processing device 1, 2 is likewise an anchor point, which is marked in the area map 3, 4 of the floor processing device 1, 2.

In order to be able to clearly identify objects 6 within the environment, the latter have a unique identifier 7, here specifically the QR codes shown on FIG. 1. Each floor processing device 1, 2 correspondingly has a file with stored identifiers 7 of objects 6 in the environment, provided they are to serve as anchor points.

As shown on FIG. 2, the first floor processing device 1 generates an area map 3, which marks positional information 9 about the individual position of the first floor processing device 1 and about the position of the base station 12 allocated to this floor processing device 1. The area map 3 has allocated to it a table with designations 8 and positional information 9 for the first floor processing device 1 and the first base station 12. However, it is likewise possible that the positional information 9 and designations 8 be recorded directly in the area map 3. In the same way, the second floor processing device 2 also generates a local and persistent area map 4 as well as a table. As it moves through the environment, the second floor processing device 2 detects its own base station 13, as well as here the first floor processing device 1, for example. A computing unit of the second floor processing device 2 recognizes the base station 13 and the first floor processing device 1 based on their specific identifier 7, wherein the detected identifiers 7 are compared with defined identifiers 7 stored in a file. If a match is found between a detected identifier 7 and a stored reference identifier, the floor processing device 2 records the designations 8 and positional information 9 allocated to the identified objects 6 in the table. For example, the designation 8 of the object 6 is derived from the identifier 7 of the detected object 6. In addition, the table also contains its own positional information 9 and designation 8 of the second floor processing device 2 itself. The objects 6 marked in the depicted table along with the second floor processing device 2 itself comprise anchor points within the area map 4 of the floor processing device 2. As shown on the figure, the area maps 3, 4 of the floor processing devices 1, 2 differ in that not all partial environmental areas 15, 16 of the environment are equally denoted in both area maps 3, 4.

In order to now generate a global area map 5 which both floor processing devices 1, 2 can use, the local area maps 3, 4 are combined into a global, persistent common area map 5. For this purpose, each floor processing device 1, 2 transmits the area map 3, 4 it generated to the external server 11. A computing unit of the server 11 combines the area maps 3, 4 based on the relative positional information 9 of the anchor points contained therein, i.e., based on the objects 6 identified by the floor processing devices 1, 2 that have a unique identifier 7. The local coordinate systems of the area maps 3, 4 are here superposed onto each other in such a way the anchor points identically present in the area maps 3, 4 lie one on top of the other. This then yields a common, global area map 5, which contains all partial environmental areas 15, 16 explored by the floor processing devices 1, 2.

After the global area map 5 has been generated, a user of the system can assign authorizations of individual floor processing devices 1, 2 to partial environmental areas 15, 16, for example via the application, so as to determine which floor processing device 1, 2 can traverse which partial environmental area 15, 16. The authorizations can also be used to determine which floor processing device 1, 2 can subsequently explore and/or remap which partial environmental areas 15, 16. This prevents partial environmental areas 15, 16 from being repeatedly cleaned or mapped by the floor processing devices 1, 2 of the system, which would otherwise result in the system expending unnecessary time and/or energy. Before a floor processing device 1, 2 sets out on a processing operation or exploratory run, it can thus query the generated global area map 5 about the status of its authorizations for the partial environmental areas 15, 16 of the environment, or about the floor processing devices 1, 2 for which authorizations are present and in which partial environmental areas 15, 16. The activities of the floor processing device 1, 2 are then further controlled based thereupon.

In the exemplary embodiment shown, the second floor processing device 2 recognizes the first floor processing device 1 based on its identifier 7. Communication between the two floor processing devices 1, 2 can also be used to further support the recognition of floor processing devices 1, 2. For example, if the second floor processing device 2 detects the first floor processing device 1 and recognizes based upon its shape that a floor processing device 1, 2 is involved, the second floor processing device can send out a query signal into the environment, which can basically be received by all floor processing devices 1, 2 present there. The first processing device 1, which then detects the second floor processing device 2 as a response to the query signal, can identify the second floor processing device 2 based on its identifier 7. Apart from floor processing devices 1, 2, the base stations 12, 13 of the environment can likewise be used to establish a connection between the local area maps 3, 4.

Even though this has not been separately described here, the identifiers 7 detected by the floor processing device 1, 2 can be compared with the stored reference identifiers by a computing unit of the external server 11 instead of by the floor processing devices 1, 2 themselves. The file having the reference identifiers can likewise be stored on the external server 11.

Although only a few embodiments of the present invention have been shown and described, it is to be understood that many changes and modifications may be made thereunto without departing from the spirit and scope of the invention.

REFERENCE LIST

1 Floor processing device
2 Floor processing device
3 Area map
4 Area map
5 Area map
6 Object
7 Identifier
8 Designation
9 Positional information
10 Memory
11 Server
12 Base station
13 Base station
14 Detection unit
15 Partial environmental area
16 Partial environmental area
17 Wheel
18 Cleaning element
19 Suction mouth
20 Navigation unit

What is claimed is:

1. A method for generating an area map for first and second automatically moving floor processing devices, comprising:

detecting with the first floor processing device first feature data of an environment, and processing the first feature data into a first area map, detecting with the second floor processing device second feature data of the environment and processing the second feature data into a second area map, identifying with the first floor processing device an object based on a unique identifier of the object as an anchor point of the environment known to the first floor processing device, and storing relative positional information of the anchor point in a coordinate system of the first area map, recognizing with the second floor processing device the same object as an anchor point known to the second floor processing device, storing relative positional information of the anchor point in a coordinate system of the second area map, and combining the first area map and the second area map into a common global area map based on the relative positional information of the anchor point contained therein, wherein the unique identifier is a code that clearly identifies the object, wherein the object having the identifier is a floor processing device, or a base station that provides a service activity for a floor processing device, or a defined element of a living space, wherein, if the first floor processing device recognizes the second floor processing device as a floor processing device based on an exterior shape of the second floor processing device, the first floor processing device sends a query signal to the environment without specific receivers, wherein the second floor processing device from among several floor processing devices of the system in immediate surroundings of the second floor processing device is identified by responding to the query, wherein the second floor processing device responds to the query signal by exploring its environment and detecting the first floor processing device, and wherein the first floor processing device identifies the second floor processing device from among several floor processing devices by the response to the query signal, wherein the first and second floor processing devices mutually identify each other based on their identifiers, and wherein the generated global area map stores authorization information for at least one partial environmental area, wherein the at least one partial environmental area indicates which floor processing device can or cannot map the partial environmental area, and wherein the map divides the environment into different partial areas with different authorizations so that the floor processing devices avoid mapping the same areas of the environment whenever possible, wherein before the floor processing device starts moving through the environment for purposes of generating or updating an area map, the floor processing device uses the global area map to first enquire about which authorizations are assigned to the first floor processing device for this purpose to identify which partial environmental areas the first floor processing device can map.

2. The method according to claim 1, wherein the first and second floor processing devices transmit their area maps to a database that belongs to an external server and/or another floor processing device and is jointly allocated to the floor processing devices, wherein a computing unit allocated to the database analyzes the area maps with respect to anchor points contained therein, recognizes an identical anchor point stored in the area maps, and superposes the area maps according to the relative positional information of the identical anchor point.

3. The method according to claim 2, wherein the database has information about one or several anchor points present in the environment, wherein the information stored in the database is drawn upon for comparison with objects present in the area maps.

4. The method according to claim 1, wherein the unique identifier is detected with a detection unit of the floor processing device.

5. The method according to claim 4, wherein the detection unit is selected from the group consisting of a camera, a laser scanner and an electronic or magnetic transmitter/receiver.

6. The method according to claim 1, wherein the generated global area map stores authorization information for at least one partial environmental area, wherein the at least one partial environmental area indicates which floor processing device can or cannot pass through the partial environmental area.

7. The method according to claim 1, wherein at least one of the floor processing devices navigates according to the common global area map once the global area map has been generated.

8. The method according to claim 1, wherein the code is selected from the group consisting of an optical code, an electronic code, a magnetic code, a shape coding and a color coding.

9. A system comprised of at least a first automatically moving floor processing device and a second automatically moving floor processing device, wherein the floor processing devices are designed to implement a method according to claim 1.

* * * * *